US012572151B2

(12) United States Patent
Kubik et al.

(10) Patent No.: US 12,572,151 B2
(45) Date of Patent: Mar. 10, 2026

(54) SELECTABLE GPS ALTITUDE HOLD

(71) Applicant: Lockheed Martin Corporation, Bethesda, MD (US)

(72) Inventors: Stephen T. Kubik, Newtown, CT (US); Adam A. Leone, Newtown, CT (US); Benjamin J. Williamson, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 258 days.

(21) Appl. No.: 18/362,147

(22) Filed: Jul. 31, 2023

(65) Prior Publication Data

US 2025/0044800 A1     Feb. 6, 2025

(51) Int. Cl.
G05D 1/04 (2006.01)
B64D 45/00 (2006.01)
G05D 1/00 (2006.01)

(52) U.S. Cl.
CPC ............. G05D 1/042 (2013.01); B64D 45/00 (2013.01)

(58) Field of Classification Search
CPC ............... G05D 1/042; G05D 2105/22; G05D 2109/25; G05D 1/248; G05D 1/48; G01C 23/005; G01C 5/005; B64D 45/00
See application file for complete search history.

(56) References Cited

U.S. PATENT DOCUMENTS 5,585,791 A      12/1996  Paterson et al.
5,646,857 A  *   7/1997  McBurney ............... G01C 5/00
                                                        701/489

(Continued)

FOREIGN PATENT DOCUMENTS

EP      1110131 B1    9/2004
EP      1462767 A1    9/2004

OTHER PUBLICATIONS

N/a: "Automatic Flight Control Summary", Jan. 20, 2012 (Jan. 20, 2012), XP055360830, Retrieved from the Internet: URL:http://aerostudents.com/files/automati           cFlightControl/automaticFlightControlFullversion.pdf [retrieved on Mar. 31, 2017]* p. 20, paragraph 5.1.2.

(Continued)

*Primary Examiner* — Mary Cheung
(74) *Attorney, Agent, or Firm* — Michael Best & Friedrich LLP

(57)                ABSTRACT

Systems and methods for controlling an aircraft to hold altitude using GPS altitude readings. One example system includes a GPS inertial navigation system, an altimeter, a human machine interface, and one or more electronic processors coupled to the GPS inertial navigation system, the altimeter, and the human machine interface. The one or more electronic processors configured to receive, from the human machine interface, a user input selecting a reference altitude. The one or more electronic processors configured to receive, from the altimeter, a current altitude for the aircraft. The one or more electronic processors configured to: when the current altitude does not exceed an altitude threshold, operate the aircraft in an altimeter altitude hold mode based on the reference altitude; and when the current altitude exceeds the altitude threshold, operate the aircraft in a GPS altitude hold mode based on the reference altitude using the GPS inertial navigation system.

20 Claims, 8 Drawing Sheets

(56)  References Cited

U.S. PATENT DOCUMENTS

| | | | | |
|---|---|---|---|---|
| 8,948,936 | B2 * | 2/2015 | Shue .................... | G05D 1/0088 |
| | | | | 701/4 |
| 11,482,122 | B2 | 10/2022 | He | |
| 2002/0169550 | A1 * | 11/2002 | Perlmutter .............. | G01S 19/49 |
| | | | | 701/472 |
| 2003/0222887 | A1 * | 12/2003 | Wilkins, Jr. ......... | G01C 23/005 |
| | | | | 345/618 |
| 2004/0015274 | A1 * | 1/2004 | Wilkins, Jr. ......... | G01C 23/005 |
| | | | | 701/3 |
| 2005/0085959 | A1 * | 4/2005 | Feyereisen .......... | G01C 23/005 |
| | | | | 701/14 |
| 2007/0096979 | A1 * | 5/2007 | Hinnant .................. | G01S 19/14 |
| | | | | 342/357.22 |
| 2019/0377366 | A1 * | 12/2019 | Worsham, II .......... | G05D 1/042 |

OTHER PUBLICATIONS

European Patent Office Search Report for Application No. 24189186.0 dated Nov. 21, 2024 (10 pages).

* cited by examiner

AIRCRAFT
10

CONTROLLER
110

PROCESSOR
115

MEMORY
120

PILOT DISPLAY
150

AVIONICS SYSTEM (AVS)
130

RALT
135

BALT
140

GPS
145

CO-PILOT DISPLAY
155

200

400

RECEIVE USER INPUT SPECIFYING A REFERENCE ALTITUDE — 402

GENERATE, ON THE HUMAN MACHINE INTERFACE, A GRAPHICAL REPRESENTATION THAT THE AIRCRAFT IS OPERATING IN A GPS ALTITUDE HOLD MODE AND A GRAPHICAL REPRESENTATION OF THE REFERENCE ALTITUDE — 404

OPERATE THE AIRCRAFT IN THE GPS ALTITUDE HOLD MODE — 406

Station 06: GPS Altitude Hold Mode

600          604          602

900

GS:  Groundspeed
IAS:  Indicated Airspeed
B:    Barometric Altitude
G:    GPS Altitude
R:    Radar Altitude
VS:  Vertical Speed Example symbology
with Radar Altitude
Hold Engaged
Radar altitude
reference of 182 feet
is being held

SELECTABLE GPS ALTITUDE HOLD

GOVERNMENT LICENSE RIGHTS

This invention was made with government support under HR0011-15-9-0004 awarded by the Defense Advanced Research Projects Agency. The government has certain rights in the invention.

FIELD

Embodiments described herein relate to pilot-configurable aircraft instrumentation and control.

SUMMARY

Some aircraft are equipped with flight control systems capable of holding the aircraft at a reference altitude. For example, flight control systems may receive altitude readings from a sensor and control the aircraft based on the sensor readings and a reference value to hold the aircraft are or near the reference altitude. To accomplish this, some aircraft are equipped with a radar altitude hold mode that is intended to keep the aircraft at a fixed height above the surface as measured by a radar altimeter sensor. However, many conditions can negatively affect radar altimeter readings. For example, radiofrequency interference and external loads attached to the aircraft may impede transmission or reception of the radar signals. In another example, an aircraft may perform operations over an ocean surface that dynamically varies due to waves, causing the sensor data from the radar altimeter to continually fluctuate causing the aircraft to continually raise and lower its altitude (referred to as "chasing waves"). Similarly, fluctuations in actual terrain height as the aircraft travels overland may lead to rapid but unnecessary changes in altitude (e.g., as compared to sea level or average terrain). Furthermore, radar altimeters' effectiveness is limited by the beam return and there therefore not viable in high altitude operations.

Some aircraft are equipped with a barometric altitude hold mode that is intended to keep the aircraft at a fixed altitude as measured by a barometric altimeter sensor. However, barometric altimeter sensors rely on atmospheric pressure measurements and assume relatively stable atmospheric conditions. Such sensors may produce fluctuating or biased readings because of rotor wake and changes in atmospheric conditions (e.g., changing weather conditions).

To address these problems, the example systems and methods described herein provide for a GPS altitude hold mode, which control the aircraft to stay at a fixed altitude above mean sea level (AMSL) based on Embedded GPS-aided inertial navigation system (EGINS) altitude readings. Because EGINS altitude readings are not based on actual terrain soundings, they are not subject to rapid fluctuations that affect radar altimeters. Likewise, EGINS altitude readings are not subject to pressure changes caused by rotor wake or atmospheric conditions. Some examples provide for manual mode selection by the pilot or remote operator of the aircraft. Some examples also provide for automated selection of an altitude hold mode by flight control systems, e.g., based on aircraft altitude. Other examples include the ability to derive a height above terrain reading by incorporating digital terrain and elevation data (DTED) and georectified terrain data. GPS provides a mean sea level value and therefore provides a consistent readout of altitude between multiple aircraft independent of their location. In contrast, above ground level altitude is terrain dependent. The common definition of the ground plane while using GPS enables both radar altitude obstacle avoidance and barometric altitude up-and-away navigation capabilities.

Embodiments and aspects described herein, by providing more widely applicable altitude readings, improve pilot situational awareness and aircraft control.

Figure 1:
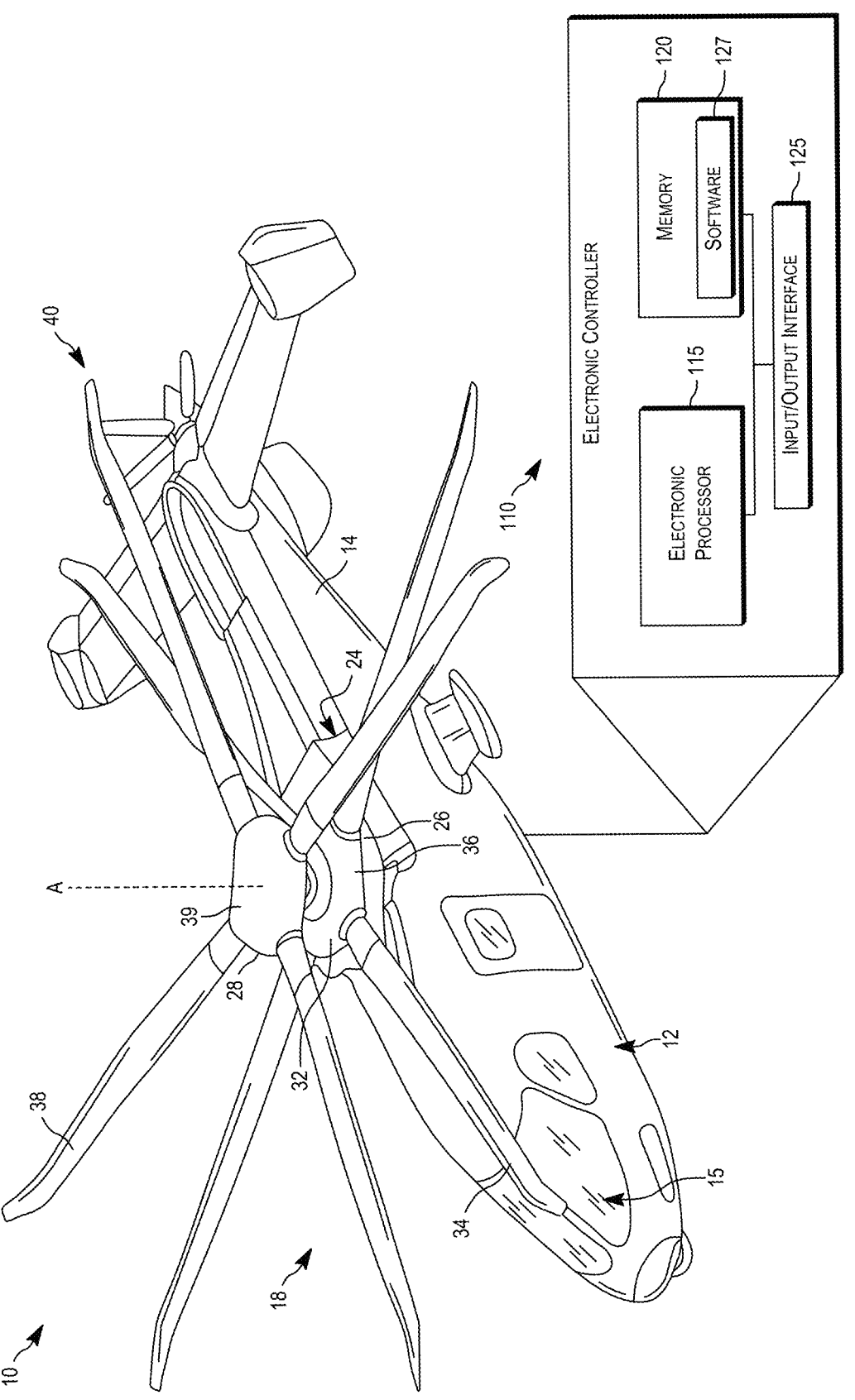
FIG. 1 illustrates an aircraft, according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION

Embodiments and examples described herein provide, among other things, systems and methods for controlling an aircraft to hold altitude using GPS inertial navigation altitude readings.

In particular, one example describes a system for controlling an aircraft. The system includes a GPS inertial navigation system, a human machine interface, and one or more electronic processors coupled to the GPS inertial navigation system and the human machine interface. The one or more electronic processors configured to receive, from the human machine interface, a user input selecting a reference altitude. The one or more electronic processors configured to, responsive to receiving the user input, generate, on the human machine interface, a graphical representation that the aircraft is operating in a GPS altitude hold mode and a graphical representation of the reference altitude. The one or more electronic processors configured to operate the aircraft in the GPS altitude hold mode by receiving a current altitude from the GPS inertial navigation system, and controlling the aircraft based on the reference altitude and the current altitude.

Another example describes a system for controlling an aircraft. The system includes a GPS inertial navigation system, an altimeter, a human machine interface, and one or more electronic processors coupled to the GPS inertial navigation system, the altimeter, and the human machine interface. The one or more electronic processors configured to receive, from the human machine interface, a user input selecting a reference altitude. The one or more electronic processors configured to receive, from the altimeter, a current altitude for the aircraft. The one or more electronic processors configured to, when the current altitude does not exceed an altitude threshold, operate the aircraft in an altimeter altitude hold mode based on the reference altitude. The one or more electronic processors configured to, when the current altitude exceeds the altitude threshold, operate the aircraft in a GPS altitude hold mode based on the reference altitude.

Another example describes a method for controlling an aircraft. The method comprises receiving, from a human machine interface, a user input selecting a reference altitude. The method comprises receiving, from an altimeter or the aircraft, a current altitude for the aircraft. The method comprises operating the aircraft in a GPS altitude hold mode based on the reference altitude when the current altitude exceeds the altitude threshold.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Referring now to the figures, FIG. 1 illustrates a co-axial rotary wing aircraft 10 according to some embodiments. The aircraft 10 includes an airframe 12 with an extending tail 14. The aircraft 10 includes a dual, counter rotating, co-axial main rotor assembly 18 that rotates about an axis A. The airframe 12 may include a cockpit 15 that may have one or more seats for flight crew (e.g., pilot and co-pilot) and optional passengers. In some embodiments, the aircraft 10 may be an uncrewed aircraft.

The main rotor assembly 18 is driven by a power source, such as, for example, one or more motors 24 via a main rotor gearbox 26. The one or more motors 24 can include an electric motor, a piston engine, a gas turbine, or other device for providing motion. The main rotor assembly 18 includes an upper rotor assembly 28 driven in a first direction (e.g., counter-clockwise) about the main rotor axis A, and a lower rotor assembly 32 driven in a second direction opposite to the first direction (e.g., clockwise) about the main rotor axis A to provide two counter rotating rotors. The upper rotor assembly 28 includes a first plurality of rotor blades 38 supported by a first rotor hub 39. The lower rotor assembly 32 includes a second plurality of rotor blades 34 supported by a second rotor hub 36. The aircraft 10 also includes a pusher-propeller 40 located at the extending tail 14 to provide translational thrust (forward or rearward) for the aircraft 10.

As also illustrated in FIG. 1 (in an expanded view), the aircraft 10 includes an electronic controller 110. In some instances, the controller 110 is configured to operate the aircraft using fly-by-wire technology. For example, the electronic controller 110 may be configured to (directly, or in communication with a flight control system) control the flight of the aircraft in response to pilot inputs or remote instructions (e.g., in the case of uncrewed flight). In some aspects, as described herein, the electronic controller 110 is configured to control the aircraft to ascend or descend to a reference altitude and to hold at the reference altitude automatically (e.g., by controlling the operation of the main rotor assembly).

In the illustrated example, the electronic controller includes an electronic processor 115, a memory 120, and an input/output interface 125, which communicate over one or more control and/or data buses (not shown). The electronic controller 110 may include fewer or additional components and may perform functions other than those explicitly described herein. The controller 110 is typically implemented using well known redundancy mechanisms to guard against equipment failure within a single controller.

In some embodiments, the electronic processor 115 is implemented as a microprocessor with separate memory, for example, the memory 120. In other embodiments, the electronic processor 115 may be implemented as a microcontroller (with memory 120 on the same chip). In addition, the electronic processor 115 may be implemented partially or entirely as, for example, a field-programmable gate array (FPGA), and application specific integrated circuit (ASIC), and the like and the memory 120 may not be needed or be modified accordingly. The electronic processor 115 executes software (e.g., the software 127) to perform the control functionality and associated methods described herein, and to control operation of the main rotor assembly 18 and the pusher-propeller 40. The memory 120 may be a non-transitory computer-readable memory. The memory 120 may include one or more types of memory storage, such as random-access memory (RAM), flash memory, solid-state memory, or hard-drive memory. In addition, or alternatively, the controller 110 may communicate with a cloud-based storage system.

The input/output interface 125 may include one or more input mechanisms (for example, touch screens, keypads, buttons, knobs, switches, levers, handles, and the like), one or more output mechanisms (for example, gauges, displays, indicator lights, speakers, haptic feedback devices, and the like), or combinations thereof. The input/output interface 125 receives input from input devices actuated by a user and provides output to output devices with which the user interacts. In some instances, as an alternative or in addition to managing inputs and outputs through the input/output interface 125, the electronic controller 110 may receive user input, provide user output, or both by communicating with an external device, as described with respect to FIG. 3.

In some embodiments, the electronic controller 110 includes on one or more microprocessors, digital signal processors, customized processors, and field programmable gate arrays (FPGAs) and unique stored program instructions (including both software and firmware) that control the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

While FIG. 1 provides an example of a co-axial rotary wing aircraft, the systems and methods described herein may also be utilized in different types of rotary wing and non-rotary wing aircraft.

Figure 2:
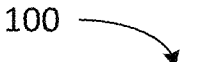
FIG. 2 schematically illustrates an aircraft instrumentation and control system, according to some examples.

FIG. 2 illustrates an example system 100 for providing aircraft instrumentation and control. According to the example illustrated in FIG. 2, the system 100 is integrated into the aircraft 10. The aircraft 10 includes the controller 110, an avionics system (AVS) 130, a pilot display 150, and a co-pilot display 155. The components of the system 100 are communicatively coupled.

As illustrated, the AVS 130 may include a plurality of systems for determining operating characteristics of the aircraft 10. In the illustrated example, the AVS 130 includes a radar altimeter (RALT) 135, a barometric altimeter (BALT) 140, and an Embedded GPS-aided inertial navigation system (EGINS) 145. In some aspects, the AVS 130 includes other systems and sensors, including Air Data system sensors (e.g., for sensing altitude and velocity), height above terrain sensors, and the like. Each system or sensor generates a signal representing a measured or determined operating characteristic of the aircraft 10 (e.g., altitude, velocity, position, attitude, heading, etc.) and transmits the signal to the controller 110 (directly or indirectly). The controller 110 receives and processes the signals. As described herein, the controller displays the characteristics (e.g., altitude) received from the RALT 135, the BALT 140, the EGINS 145, and other sensors and systems using the input/output interface 125, the pilot display 150, the co-pilot display 155, or combinations of the foregoing. For example, the controller may generate and display virtual gauges as part of a graphical user interface. In another example, physical gauges (or gauges combining physical indicators and customizable graphical elements) display the information.

In some embodiments, such as the embodiment illustrated in FIG. 1, the pilot display 150 and the co-pilot display 155 are integrated into the aircraft 105. For example, the pilot display 150 and the co-pilot display 155 may be electrically coupled to the controller 110, coupled to an instrument panel of the aircraft 105, or included in the AVS 130. In some instances, the pilot display 150, the co-pilot display 155, or both may provide a user interface for an electronic flight bag (EFB) application. In some instances, the displays include user input capabilities, such as a touch screen. In some instances, the displays may be or may include a heads up display (HUD). In some instances, the system 100 operates using, among other things, augmented reality technology, where live images are displayed or visible through the displays and augmented with text, graphics, or graphical user interface elements superimposed on or otherwise combined with the live images. In some embodiments, the system 100 operates using, among other things, virtual reality technology, where actual or simulated images are displayed (for example, on the displays) with text, graphics, or graphical user interface elements superimposed on or otherwise combined with the images.

Figure 3:
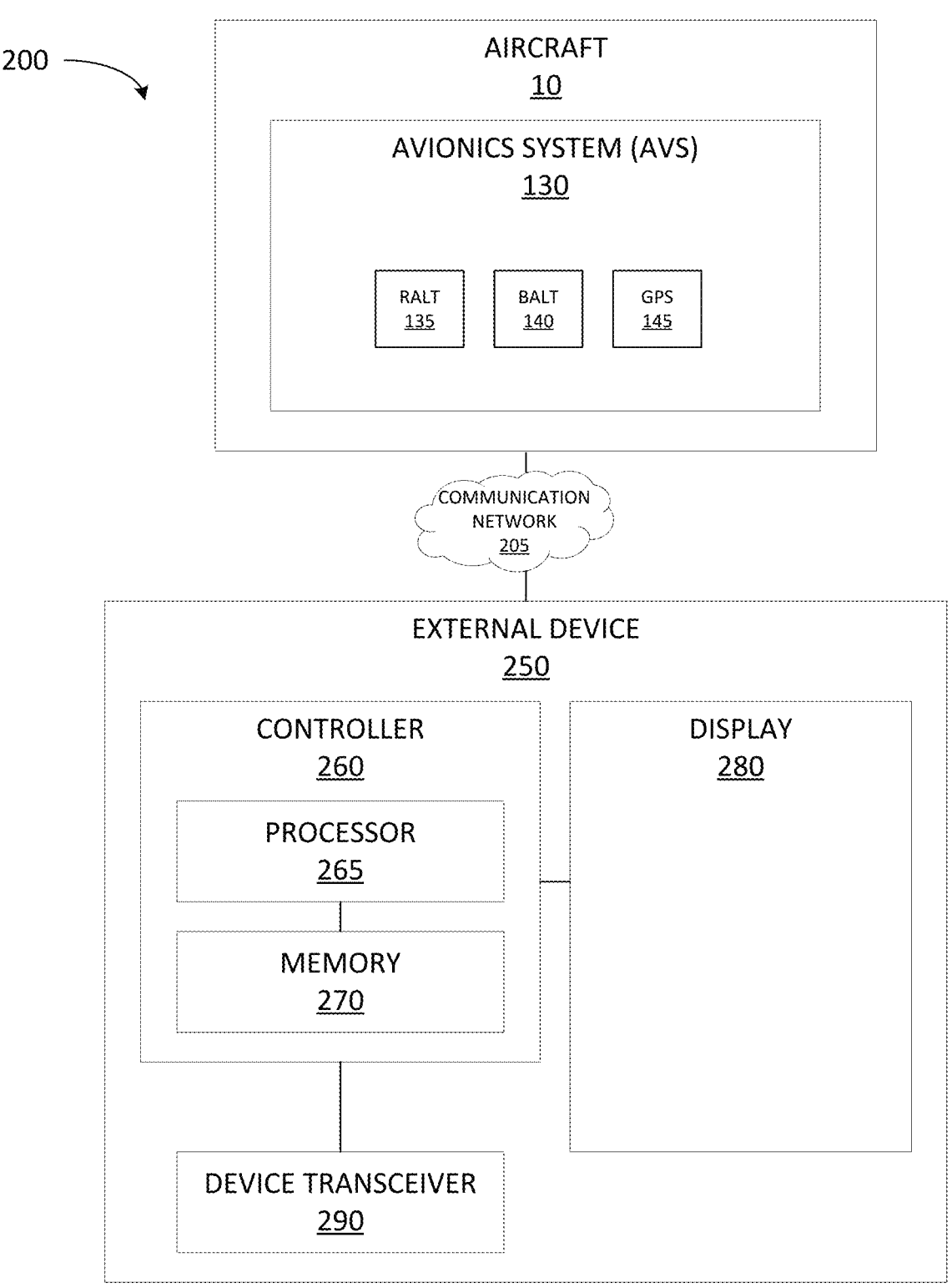
FIG. 3 schematically illustrates an alternative aircraft instrumentation and control system, according to some examples.

FIG. 3 illustrates an alternative system 200 for providing aircraft instrumentation and control. Unlike the system 100 illustrated in FIG. 1, the system 200 of FIG. 2 illustrates an alternative distributed configuration. The system 200 may include the aircraft 10, the AVS 130, the RALT 135, the BALT 140, the EGINS 145 of the system 100 of FIG. 1. The system 200 further includes a communication network 205 (e.g., a suitable wireless data network). The communication network 205 provides communicative coupling between the aircraft 10 and an external device 250.

The external device 250 may be a mobile device, such as a smart phone, a tablet computer, a laptop computer, or the like. In some instances, the external device 250 is a device separate from the internal systems of the aircraft 10, but still located and operated from within the aircraft 10. For example, in these instances the external device 250 may be a tablet computer, a mobile phone, or the like. In other embodiments, the external device 250 is located external to the aircraft 10, for example in a control tower or in a ground control station, which may support remote operations of an uncrewed aircraft.

The external device 250 includes a controller 260, a display 280, and a device transceiver 290. The device transceiver 290 and display 280 may be electrically, mechanically, and/or communicatively coupled to the controller 260. The controller 260 is an electronic controller, which may include a processor 265 and a memory 270. The memory 270 may be a non-transitory computer-readable memory. The memory 270 may include one or more types of memory storage, such as random-access memory (RAM), flash memory, solid-state memory, or hard-drive memory. In addition, or alternatively, the controller 260 may communicate with a cloud-based storage system. The device transceiver 290 is configured to send and receive signals to the aircraft 105 via the communication network 205.

In some instances, the display 280 is configured to operate as a duplicate of either the pilot display 150 or the co-pilot display 155. In some instances, the display 280 operates as a replacement of either the pilot display 150 or the co-pilot display 155. In some instances, the display 280 operates as a supplement to the pilot display 150, the co-pilot display 155, or both. In some instances, the display 280 includes user input capabilities, such as a touch screen. In some instances, the display 280 may be a head-mounted display (HMD), an optical head-mounted display (OHMD), or the display of a pair of smart glasses. In some instances, the external device 250 operates using, among other things, augmented reality technology, where live images are displayed or visible through the display 280 and augmented with text, graphics, or graphical user interface elements superimposed on or otherwise combined with the live images. In some instances, the external device 250 operates using, among other things, virtual reality technology, where actual or simulated images are displayed (for example, on the display 280) with text, graphics, or graphical user interface elements superimposed on or otherwise combined with the images.

Furthermore, other variations than the system 100 shown in FIG. 2 and the system 200 shown in FIG. 3 are possible. For example, some instances may distribute the components of the system 100, the system 200, or both across multiple devices.

Figure 4:
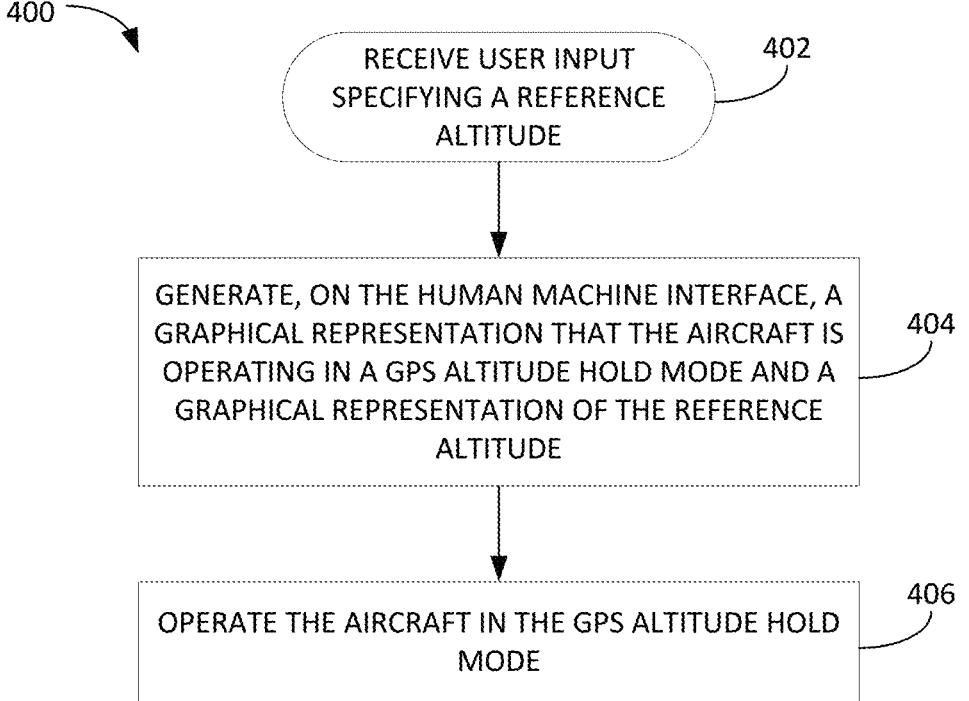
FIG. 4 is a flowchart illustrating a method for operating an aircraft, according to some examples.

FIG. 4 is a flowchart illustrating a method 400 for operating an aircraft. The method 400 may be implemented on the system 100 of FIG. 2, the system 200 of FIG. 3, and/or a different system. As an example, the method 400 is described as being performed by the electronic processor 115. However, the method 400 may be executed on one or more electronic processors according to examples described herein.

At block 402, the electronic processor 115 receives, from a human machine interface (for example, a graphical user interface presented on the display 150, the co-pilot display 155, or the display 180; a portion of the input/output interface 125; or combinations of the foregoing), a user input selecting a reference altitude. For example, the electronic processor 115 may receive a button press (e.g., a virtual button or a physical button on a control of the aircraft, actuated by a pilot), which activates an altitude hold mode and selects the current altitude as the reference altitude. In another example, a pilot may enter a number for the reference altitude using a keypad, dial, knob, or another suitable input means. In another example, the pilot may select a reference altitude by actuating a switch or other input means (referred to as a "beep") to increment or decrement a current reference altitude.

Figure 6:
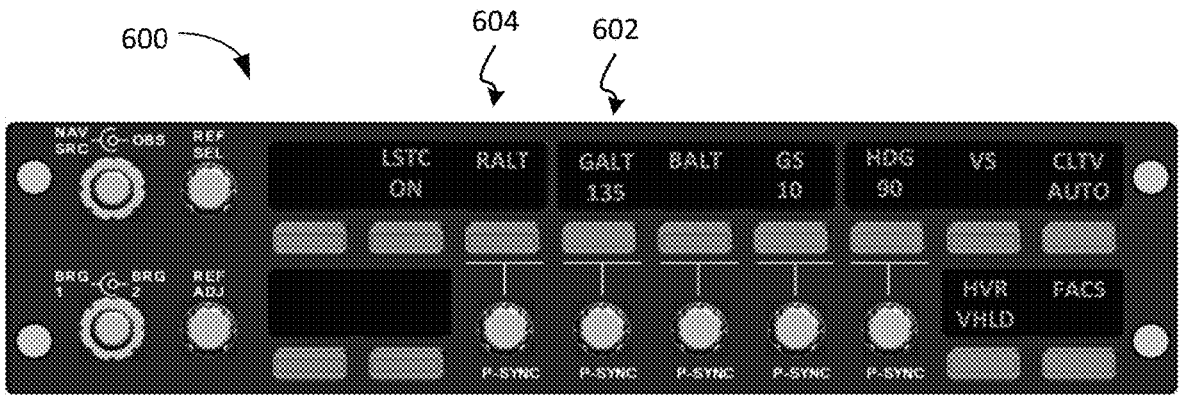
FIG. 6 is an example user interface, according to some examples.

At block 404, responsive to receiving the user input, the electronic processor 115 generates, on the human machine interface, a graphical representation that the aircraft is operating in a GPS altitude hold mode and a graphical representation of the reference altitude. For example, the electronic processor 115 may present the graphical representations within a graphical user interface presented on the display 150, the co-pilot display 155, or the display 180. As illustrated in FIG. 6, in some instances, the electronic processor 115 presents the graphical representations using programable control panels. FIG. 6 illustrates a programmable control panel 600, which includes a combination of physical and virtual inputs and output elements. In some aspects, element 602 may be a display coupled with an illuminated switch. In some aspects, the display presents the graphical representation that the aircraft is operating in a GPS altitude hold mode using the letters "GALT" (e.g., the letters may illuminate or change color to signify that the GPS altitude hold mode is active). In some aspects, the illuminated switch may be used as the graphical representation that the aircraft is operating in a GPS altitude hold mode (e.g., by illuminating in green when the mode is active). The display also presents the graphical representation of the reference altitude using the numbers "135." In some instances, the control panel 600 may be entirely virtual and produced on a touch screen display (e.g., the display 150, the co-pilot display 155, or the display 180). The control panel 600 is provided as one example. Other means of displaying the graphical representations are possible.

Figure 7:
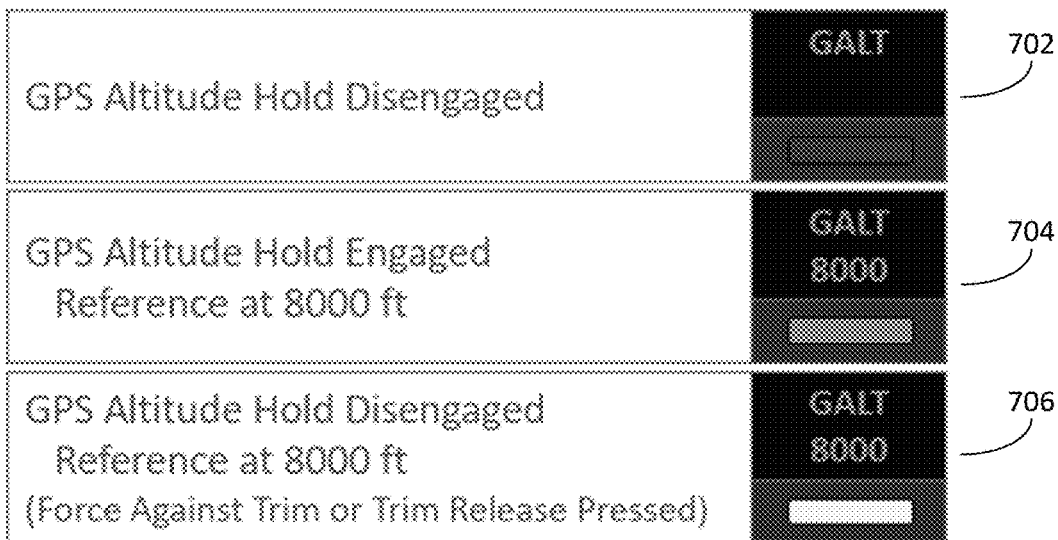
FIG. 7 is an example user interface, according to some examples.

FIG. 7 illustrates several examples of the control panel 600 in operation. For example, element 702 indicates that the GPS altitude hold mode is disengaged because the illuminated switch portion of the element is not illuminated. In another example, element 704 indicates that the GPS altitude hold mode is engaged because the illuminated switch portion of the element is illuminated (e.g., using the color green). In another example, element 706 indicates that the GPS altitude hold mode is suspended by an operation of the pilot (e.g., applying force to the collective stick or releasing trim) because the illuminated switch portion of the element is illuminated in a color other than the color used to indicate engagement (e.g., using the color yellow). In both elements 704 and 706, the reference altitude is indicated as 8000 ft. When collective trim release is re-referencing the altitude, the electronic processor 115 may provide a digital readout, a tape display, or a dial indicator of altitude to provide an indication to the pilot of the rate of change of the altitude.

Returning to FIG. 4, the electronic processor 115, at block 406, operates the aircraft in the GPS altitude hold mode. The electronic processor 115 receives a current altitude for the aircraft from the GPS inertial navigation system 145 and controls the aircraft based on the reference altitude and the current altitude. For example, the electronic processor 115 may compare the current altitude to the reference altitude. When the current altitude and the reference altitude are the same or within a threshold altitude difference of one another, the electronic processor 115 controls the aircraft to maintain the current altitude within the threshold of the reference altitude. The threshold altitude difference is an acceptable variance from the reference altitude selected to ensure the aircraft will remain close to the reference value, while avoiding the need for frequent minor altitude adjustments.

In another example, when the current altitude is not within a threshold of the reference altitude, the electronic processor 115 controls the aircraft based on the reference altitude and the current altitude by controlling the aircraft to ascend or descend until the current altitude is within the threshold of the reference altitude (e.g., the electronic processor 115 may execute a back drive function to control a motor to drive the collective stick to the appropriate power location). In some aspects, the electronic processor 115 controls the aircraft to ascend or descend subject to one or both of a vertical speed limit and a vertical acceleration limit.

In some aspects, while operating in GPS altitude hold mode, it improves pilot situational awareness if they also know the height above terrain of the aircraft. In some examples, the electronic processor 115 retrieves digital terrain and elevation data (e.g., from a local or remote database). The electronic processor 115 determines a height above terrain for the aircraft based on the current GPS altitude and the digital terrain and elevation data. For example, the electronic processor 115 may determine an elevation for the latitude and longitude of the aircraft and subtract the elevation from the GPS altitude (which is a height above mean sea level) to estimate the height above terrain (or height above average terrain) for the aircraft. The electronic processor 115 controls the human machine interface to display the height above terrain to the pilot, co-pilot, or both.

In some aspects, the pilot is able to suspend or re-reference the GPS altitude hold mode. For example, the electronic processor 115, may detect that the pilot is applying force against the trim of the collective stick or a trim release (e.g., a user input requesting trim release). Responsive to detecting one of a collective trim release and a force against trim, the electronic processor 115 stops generating the graphical representation that the aircraft is operating in the GPS altitude hold mode (e.g., as described above with respect to FIG. 7). The electronic processor 115 also stops operating the aircraft in the GPS altitude hold mode and begins controlling the altitude of the aircraft based on pilot inputs to the collective (or allowing other flight control systems to do so). In some aspects, the effect is temporary. For example, when the electronic processor 115 detects a force against trim, it may interpret this as the pilot temporarily adjusting the aircraft altitude and resume operating the aircraft in the GPS altitude hold mode based on the reference altitude when the force against trim is released by the pilot. In some aspects, force against collective trim suspends a motor back drive feature and allows the pilot to make momentary inputs. Once the collective force is released, the electronic processor 115 controls the aircraft to reacquire the reference altitude. Collective trim release allows the pilot to re-reference/change the altitude being held. A button on the collective releases the trim motor forces and provides a digital readout of the new reference altitude based on collective position and aircraft state.

In some aspects, the pilot is able to select between GPS altitude hold mode and an altimeter altitude hold mode. An altimeter hold mode is one where the current altitude is provided by an altimeter, for example, a radar altimeter or a barometric altimeter.

For example, the electronic processor 115 receive from the human machine interface a user input selecting an altimeter altitude hold mode (e.g., a button press or other suitable input). In some aspects, the user input also includes a reference altitude. In some aspects, the input selecting the altimeter altitude hold mode is a request to switch modes but maintain the current reference altitude.

Figure 8:
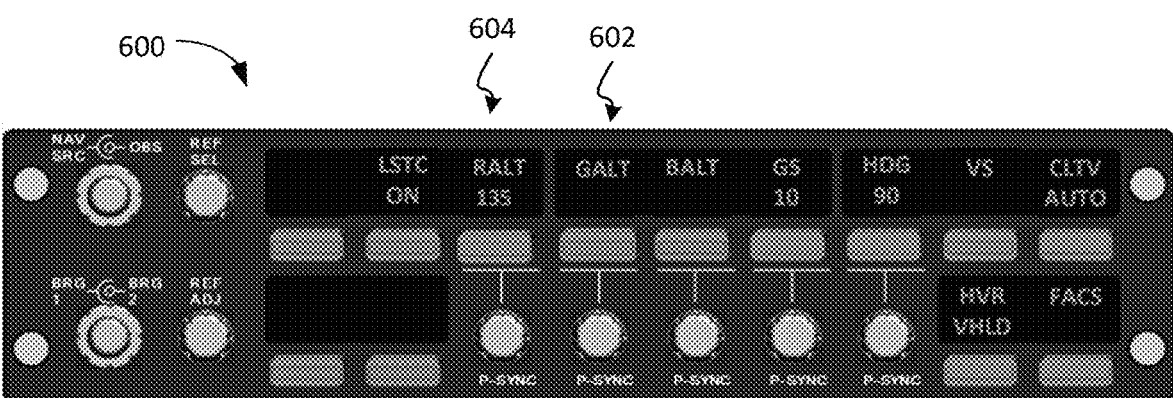
FIG. 8 is an example user interface, according to some examples.
Figure 9:
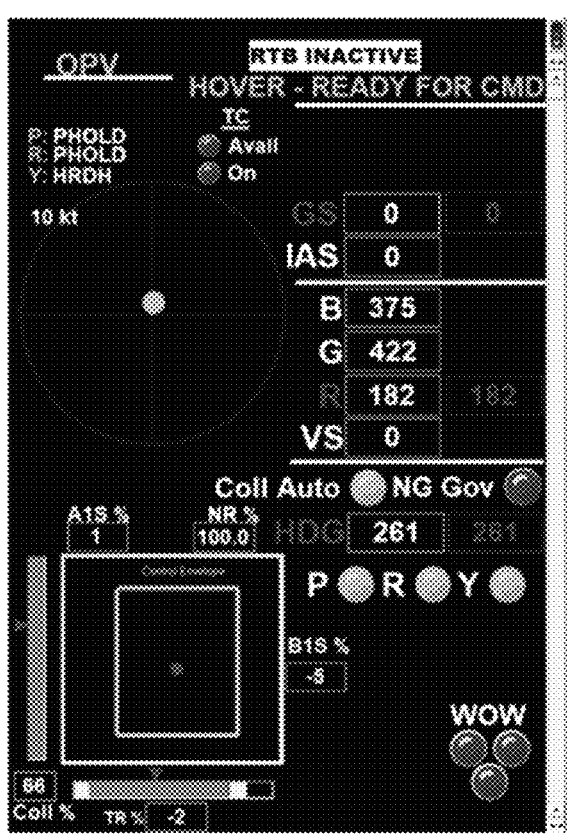
FIG. 9 is an example user interface, according to some examples.

Responsive to receiving the user input, the electronic processor 115 generates, on the human machine interface, a graphical representation that the aircraft is operating in the altimeter altitude hold mode and stops generating the graphical representation that the aircraft is operating in the GPS altitude hold mode. For example, as illustrated in FIG. 8, the element 602 no longer displays the reference altitude and the illuminated switch is no longer illuminated. Similarly, the element 604, with is labeled "RALT" for radar altimeter, displays the reference altitude and its illuminated switch is illuminated (e.g., in the color green). FIG. 9 illustrates another example of a graphical representation that the aircraft is operating in the altimeter altitude hold mode. FIG. 9 illustrates an example of a cockpit interface display 900. As illustrated in FIG. 9, the letter "R" is highlighted to indicate that a altimeter altitude hold mode (specifically the radar altitude hold mode) is engaged with a reference value of 182.

The electronic processor 115 then operates the aircraft in the altimeter altitude hold mode. The electronic processor 115 receives a current altitude for the aircraft from an altimeter (e.g., the radar altimeter (RALT) 135 or the barometric altimeter (BALT) 140) and controls the aircraft based on the reference altitude and the current altitude. The electronic processor 115 controls the aircraft to achieve and maintain the reference altitude, as described above with respect to the GPS altitude hold mode.

Figure 5:
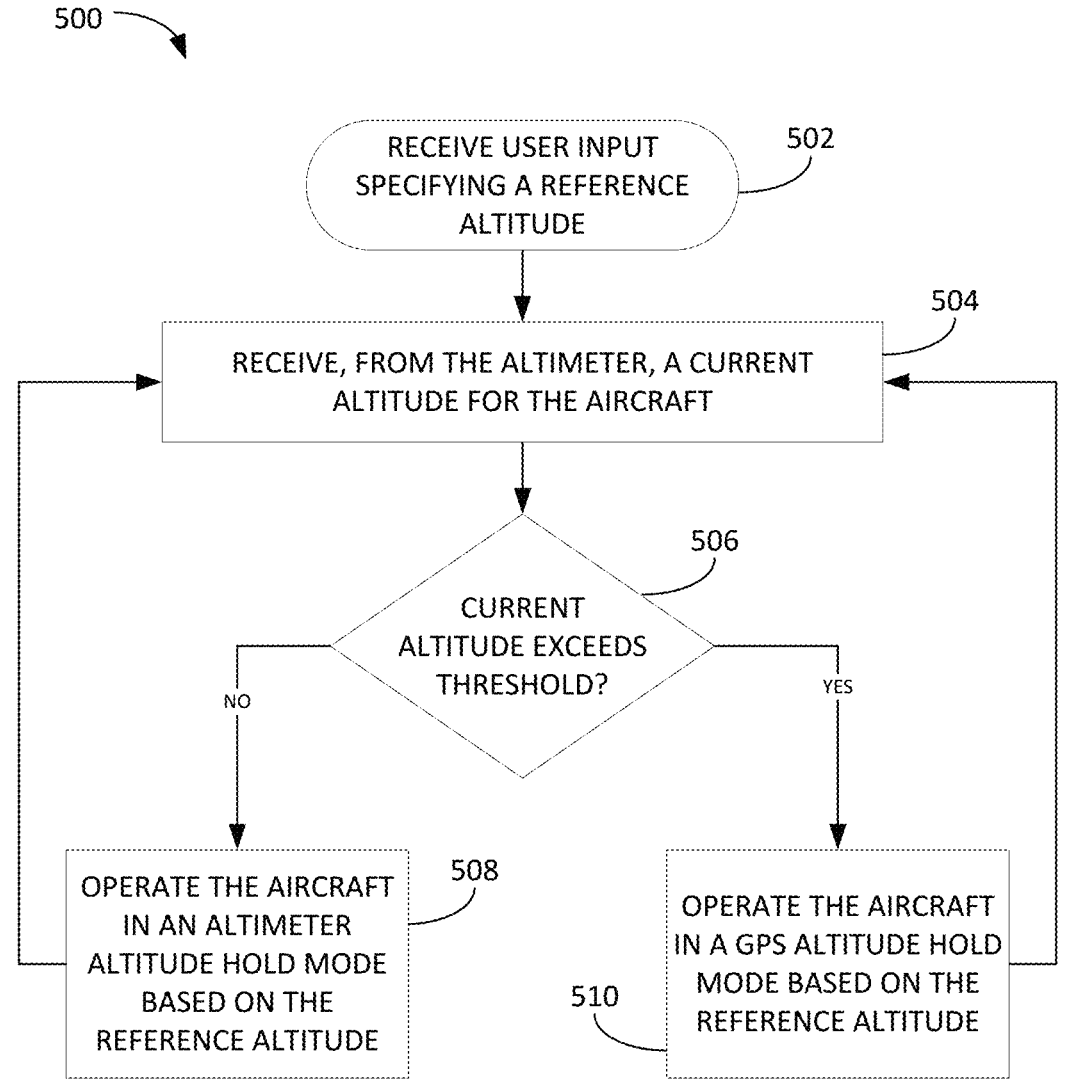
FIG. 5 is a flowchart illustrating a method for operating an aircraft, according to some examples.

FIG. 5 is a flowchart illustrating a method 500 for operating an aircraft by automatically switching between GPS altitude hold and altimeter altitude hold modes. The method 500 may be implemented on the system 100 of FIG. 2, the system 200 of FIG. 3, and/or a different system. As an example, the method 500 is described as being performed by the electronic processor 115. However, the method 500 may be executed on one or more electronic processors according to examples described herein.

At block 502, the electronic processor 115 receives, from the human machine interface, a user input selecting a reference altitude. For example, the electronic processor 115 may receive a button press (e.g., a virtual button or a physical button on a control of the aircraft, actuated by a pilot), which activates an automatic altitude hold mode and selects the current altitude as the reference altitude. In another example, a pilot may enter a number for the reference altitude using a keypad, dial, knob, or another suitable input means. In another example, the pilot may select a reference altitude by actuating a switch or other input means (referred to as a "beep") to increment or decrement a current reference altitude.

At block 504, the electronic processor 115 receives, from an altimeter, a current altitude for the aircraft. The altimeter may be, for example, a radar altimeter or a barometric altimeter. In some aspects, the altimeter providing the altitude may depend on whether the aircraft is currently operating in an altimeter altitude hold mode, as described herein.

At block 506, the electronic processor 115 compares the reference altitude to an altitude threshold. When the current altitude does not exceed an altitude threshold, the electronic processor 115, at block 508 operates the aircraft in an altimeter altitude hold mode based on the reference altitude, as described herein.

When the current altitude exceeds the altitude threshold (at block 506), the electronic processor 115, at block 510 operates the aircraft in a GPS altitude hold mode based on the reference altitude, as described herein.

In some aspects, the altitude threshold is determined based on the limitations of the radar altimeter. A radar altimeter depends on a radar beam pointed toward the ground. The closest beam return is used to determine AGL (Above Ground Level) data. In some examples, the threshold is set based on a distance, at which receiving a return beam becomes problematic. In some examples, the threshold may be dynamic, based on current radar reception conditions.

Figure 10:
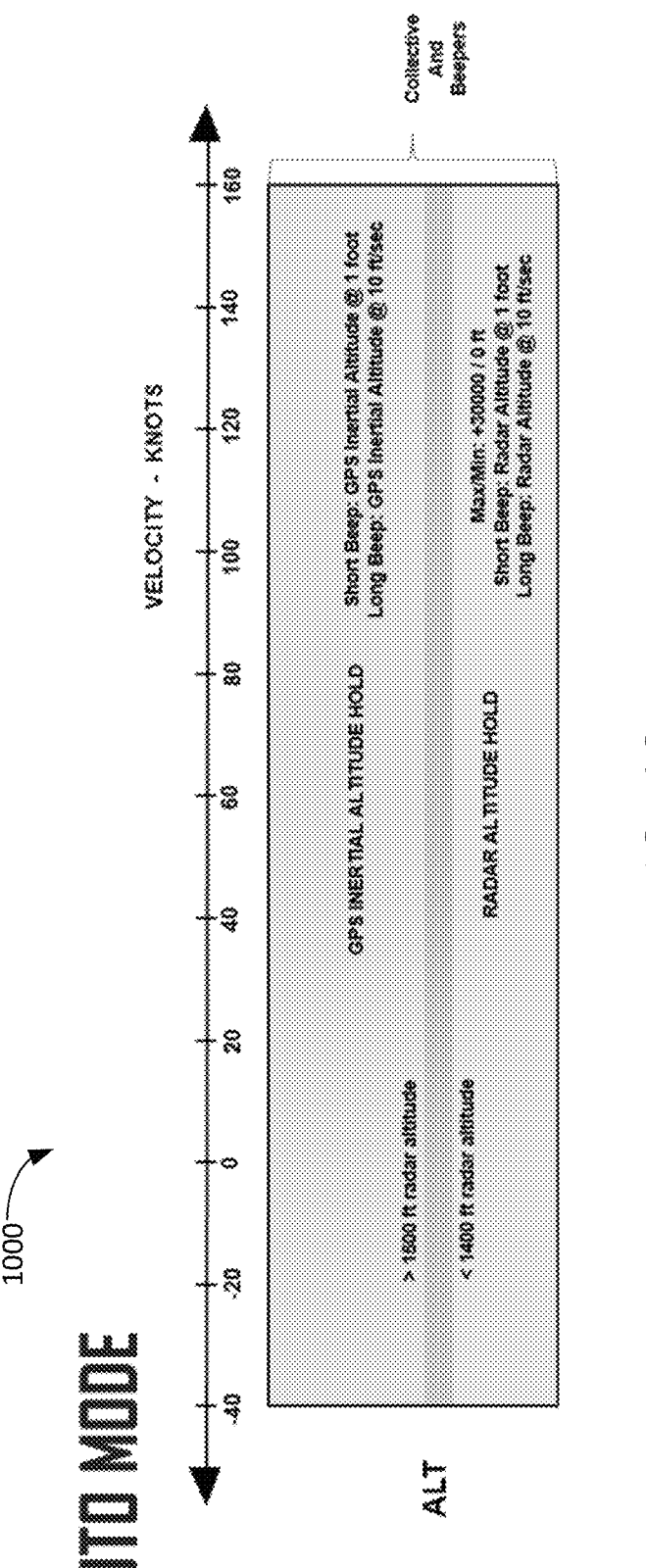
FIG. 10 is a chart illustrating aspects of the operation of the method of FIG. 5, according to some examples.

FIG. 10 provides a chart 1000, which illustrates aspects of one example operation of the method 500. In the illustrated example, the aircraft will operate in a GPS altitude hold mode when it is above 1500 ft of radar altitude. The aircraft will operate in a radar altitude hold mode when it is below 1400 ft of radar altitude. As illustrated in FIG. 10, there may be some overlap between modes of operation while the aircraft ascends and descends (e.g., to effect a new reference altitude).

One or more example embodiments are described and illustrated in the preceding description and accompanying drawings. These embodiments are not limited to the specific details provided herein and may be modified in various ways without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims.

Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. Further, it is expected that one of ordinary skill, notwithstanding possibly significant effort and many design choices motivated by, for example, available time, current technology, and economic considerations, when guided by the concepts and principles disclosed herein will be readily capable of generating such software instructions with minimal experimentation.

As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the terms "graphical representation" and "display," as they pertain to representing or displaying a value is not meant to limit the graphical form used to communicate the value. It could include, for example, numerical text, dials, bars, colors, and the like. It should also be understood that graphical representation or display of a value can communicate the value in absolute terms, such as a number corresponding to an aircraft sensor value, or it may communicate the value in relative terms, such as the difference between the aircraft sensor value and a reference value.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

In the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make any one or more than one of the multiple determinations.

Various features and advantages of some embodiments are set forth in the following claims.

What is claimed is:

1. A system for controlling an aircraft, the system comprising:
   a GPS inertial navigation system;
   a human machine interface; and
   one or more electronic processors coupled to the GPS inertial navigation system and the human machine interface;
   wherein the one or more electronic processors configured to:
      receive, from the human machine interface, a user input selecting a reference altitude;
      responsive to receiving the user input, generate, on the human machine interface, a graphical representation that the aircraft is operating in a GPS altitude hold mode and a graphical representation of the reference altitude;
      operate the aircraft in the GPS altitude hold mode by:
      receiving a current altitude from the GPS inertial navigation system; and
      controlling the aircraft based on the reference altitude and the current altitude.

2. The system of claim 1, further comprising:
   an altimeter coupled to the one or more electronic processors;
   wherein the one or more electronic processors are configured to:
   receive from the human machine interface, a second user input selecting an altimeter hold mode;
   responsive to receiving the second user input, generate, on the human machine interface, a graphical representation that the aircraft is operating in the altimeter altitude hold mode and stop generating the graphical representation that the aircraft is operating in the GPS altitude hold mode;
   operate the aircraft in the altimeter altitude hold mode by:
   receiving a current altitude from the altimeter; and
   controlling the aircraft based on the reference altitude and the current altitude from the altimeter.

3. The system of claim 2, wherein the altimeter is one of a radar altimeter and a barometric altimeter.

4. The system of claim 1, wherein the one or more electronic processors are configured to, when the current altitude is within a threshold of the reference altitude, control the aircraft based on the reference altitude and the current altitude by controlling the aircraft to maintain the current altitude within the threshold of the reference altitude.

5. The system of claim 1, wherein the one or more electronic processors are configured to, when the current altitude is not within a threshold of the reference altitude, control the aircraft based on the reference altitude and the current altitude by controlling the aircraft to ascend or descend until the current altitude is within the threshold of the reference altitude.

6. The system of claim 5, wherein the one or more electronic processors are configured to control the aircraft to ascend or descend subject to at least one of a vertical speed limit and a vertical acceleration limit.

7. The system of claim 1, wherein the one or more electronic processors are further configured to:

responsive to detecting one of a collective trim release and a force against trim:

stop generating the graphical representation that the aircraft is operating in the GPS altitude hold mode; and stop operating the aircraft in the GPS altitude hold mode by controlling the altitude of the aircraft based on pilot inputs to the collective.

8. The system of claim 1, wherein the one or more electronic processors are further configured to:

retrieve digital terrain and elevation data;

determine a height above terrain for the aircraft based on the current altitude and the digital terrain and elevation data; and control the human machine interface to display the height above terrain.

9. The system of claim 1, wherein the human machine interface includes one selected from the group consisting of a display integrated into the aircraft, a display of a mobile device in communication with the aircraft, a heads up display, a head mounted display, a remote control display, and a remote monitoring display.

10. A system for controlling an aircraft, the system comprising:

a GPS inertial navigation system;

an altimeter;

a human machine interface; and one or more electronic processors coupled to the GPS inertial navigation system, the altimeter, and the human machine interface;

wherein the one or more electronic processors configured to:

receive, from the human machine interface, a user input selecting a reference altitude;

receive, from the altimeter, a current altitude for the aircraft;

when the current altitude does not exceed an altitude threshold, operate the aircraft in an altimeter altitude hold mode based on the reference altitude; and when the current altitude exceeds the altitude threshold, operate the aircraft in a GPS altitude hold mode based on the reference altitude using the GPS inertial navigation system.

11. The system of claim 10, wherein the one or more electronic processors are further configured to:

generate, on the human machine interface, a graphical representation of the reference altitude;

when the current altitude does not exceed an altitude threshold, generate, on the human machine interface, a graphical representation that the aircraft is operating in the altimeter altitude hold mode; and when the current altitude exceeds the altitude threshold, generate, on the human machine interface, a graphical representation that the aircraft is operating in the GPS altitude hold mode.

12. The system of claim 10, wherein the one or more electronic processors are configured to operate the aircraft in an altimeter altitude hold mode by, when the current altitude is within a second threshold of the reference altitude, controlling the aircraft to maintain the current altitude within the second threshold of the reference altitude.

13. The system of claim 10, wherein the one or more electronic processors are configured to operate the aircraft in an altimeter altitude hold mode by, when the current altitude is not within a threshold of the reference altitude, controlling the aircraft to ascend or descend until the current altitude is within the second threshold of the reference altitude.

14. The system of claim 13, wherein the one or more electronic processors are configured to control the aircraft to ascend or descend subject to at least one of a vertical speed limit and a vertical acceleration limit.

15. The system of claim 10, wherein the one or more electronic processors are configured to operate the aircraft in a GPS altitude hold mode by:

receiving the current altitude from the GPS inertial navigation system; and when the current altitude is not within a threshold of the reference altitude, controlling the aircraft to ascend or descend until the current altitude is within the second threshold of the reference altitude.

16. The system of claim 10, wherein the one or more electronic processors are configured to operate the aircraft in a GPS altitude hold mode by:

receiving the current altitude from the GPS inertial navigation system; and when the current altitude is not within a threshold of the reference altitude, controlling the aircraft to ascend or descend until the current altitude is within the second threshold of the reference altitude.

17. The system of claim 16, wherein the one or more electronic processors are configured to control the aircraft to ascend or descend based on at least one of a vertical speed limit and a vertical acceleration limit.

18. The system of claim 10, wherein the one or more electronic processors are configured to operate the aircraft in a GPS altitude hold mode by:

receiving the current altitude from the GPS inertial navigation system;

retrieving digital terrain and elevation data;

determining a height above terrain for the aircraft based on the current altitude and the digital terrain and elevation data; and controlling the human machine interface to display the height above terrain.

19. The system of claim 10, wherein the altimeter is one of a radar altimeter and a barometric altimeter.

20. A method for controlling an aircraft, the method comprising:

receiving, from a human machine interface, a user input selecting a reference altitude;

receiving, from an altimeter or the aircraft, a current altitude for the aircraft; and when the current altitude exceeds the altitude threshold, operating the aircraft in a GPS altitude hold mode based on the reference altitude.

* * * * *